United States Patent

Hughes et al.

[11] Patent Number: 5,770,320
[45] Date of Patent: Jun. 23, 1998

[54] ASSEMBLING SHEET METAL MEMBERS

[75] Inventors: Richard P. Hughes; Patrick T. Lawless, both of Kanata, Canada

[73] Assignee: Northern Telecom Limited, Montreal, Canada

[21] Appl. No.: 720,276

[22] Filed: Sep. 26, 1996

[51] Int. Cl.⁶ .............................. B65D 6/28; F16B 17/00
[52] U.S. Cl. ........................ 428/571; 428/582; 428/596; 428/598; 220/690; 220/691; 403/274; 403/375; 403/381
[58] Field of Search ................................... 428/571, 572, 428/582, 596, 598, 594; 220/4.02, 690, 691; 361/732, 747, 759; 403/274, 375, 381

[56] References Cited

U.S. PATENT DOCUMENTS

| | | | |
|---|---|---|---|
| 2,164,634 | 7/1939 | Barrett | 403/274 |
| 2,722,625 | 11/1955 | Bingeman et al. | 220/690 |
| 3,050,160 | 8/1962 | Chesser | 403/274 |
| 3,083,856 | 4/1963 | Appleton | 220/690 |
| 4,077,095 | 3/1978 | Oliff | 403/381 |
| 4,479,737 | 10/1984 | Bergh et al. | 220/690 |

*Primary Examiner*—John J. Zimmerman
*Attorney, Agent, or Firm*—R. J. Austin

[57] ABSTRACT

A sheet metal member with a securing arrangement to securely attach the member to another sheet member. The securing arrangement is an elongate structure with two ends integral with an edge of a body of the sheet metal member. The elongate structure extends between its ends around a spatial area and has a specific width. The elongate structure is flexible to a greater width in which a locking part securely grips the other sheet member between the body and the locking part of the structure.

15 Claims, 6 Drawing Sheets

ASSEMBLING SHEET METAL MEMBERS

This invention relates to assembling sheet metal members and is more particularly concerned with the formation of securing or locking arrangements for securing sheet metal members together.

BACKGROUND OF THE INVENTION

In assembling sheet metal members together to form panels during construction of cabinets, containers or other structures, it is not unusual to join the members together by riveting or welding. Normally such methods of attachment are convenient and are factory controlled for cheapness and accuracy of panel alignment, but sometimes situations arise where the above known methods of attachment are lacking in their suitability for future use of the finished containers.

One such case is the use of structural sheet metal members for containing electronic equipment. Such containers, for instance in the case of shelves for containing edge cards, require the capability of providing not only good structural strength and rigidity, but also are required for providing protection against electromagnetic radiation and also for ensuring that the whole of the structure may be grounded. Such containers for use with electronic equipment may comprise sheet metal members which are riveted together, but riveting attachments are suspect in providing the required protection against electromagnetic radiation and also for a total grounding effect. Hence, welding of such sheet metal members is common. Welding provides good electromagnetic radiation protection and also a continuity between the sheet metal members which ensures a good grounding of the structure. It is convenient in certain electronic equipment and shelf structures, for parts of the equipment to be assembled to sheet metal members of the structures as the structures are being built. However in such assembly procedures, the use of welding for putting such sheet metal members together raises the problem that welding temperatures may well damage or destroy electronic equipment already added to sheet metal members thereby at least impairing the functionality of the total circuitry within the container. Hence design considerations have to take into account, in the main, all of the welding processes have taken place before electronic equipment may be secured to walls of the containers or inserted within the containers. A further problem with welding is that welded containers are not easily dismantled and a finished container upon no longer being required for use, may be considered as scrap material.

It is also known in the metal sheet container industry, that to join two sheet metal members together one of the members may be provided with outwardly extending metal tags which are passed through apertures in the other metal member. The metal tags are then bent over at the other side of the apertures and onto a surface of the other metal member so as to hold the members together. However, such a method of attachment does not provide the rigidity which is required in containers for containing electronic equipment and secondly the tags do not engage the other sheet metal member with sufficient force to create a gas tight seal between the members. As a result, such methods of container manufacture cannot provide the protection against electromagnetic radiation which is required for electronic equipment and also cannot guarantee that efficient grounding may be provided for each of the sheet metal members of the container.

SUMMARY OF THE INVENTION

The present invention seeks to provide a sheet metal member which when the sheet metal member is attached to another sheet metal member, will satisfactorily provide the strength, EMI protection and grounding requirements for a container to house electronic equipment.

Accordingly the present invention provides a sheet metal member having a sheet metal body and a securing arrangement for securing the sheet metal member to another sheet member with a surface of the body of the sheet metal member engaging the other sheet member, and with the securing arrangement extending through an aperture in the other sheet member, the securing arrangement comprising an elongate structure having two ends integral with the sheet metal body with the elongate structure extending from the surface of the body and with the elongate structure and the body together extending around a spatial area, the structure having a specific width and being flexibly and plastically movable into a locked state of greater width in which a locking part of the structure is flexed outwards and towards the surface of the body and into a securing position to securely grip the other sheet member between the surface of the body and the locking part of the structure.

Thus, in the construction according to the invention as defined above the securing arrangement is an integral part of the sheet metal body and may be conveniently provided by a stamping operation from a larger sheet.

The sheet metal member may be provided to be secured to the other sheet member which may be of any desired material. The other sheet member may be for instance, of metal, plastic or cast iron. If the assembled construction is to be used however, for EMI protection and grounding requirements then the other sheet member would of necessity, in many cases, need to be of an electrically conductive material, i.e. conductive metal.

In the above structure according to the invention, the elongate structure preferably comprises a plurality of links connected end-to-end in an integral series. In this preferred structure, end links are integral with the body with at least one of the end links providing a locking part of the structure, i.e. this end link provides a holding link to grip the other sheet member against the surface of the body. Preferably the two end links provide holding links as this gives greater securing attachment between the sheet members. Where a single holding link is provided, it may be found that two securing arrangements may be necessary in slightly spaced positions with their single holding links applying gripping loads in different directions to the body to provide sufficient securing action.

Rather conveniently and as the sheet metal member with its securing arrangement may be formed by a stamping operation, the series of links and the sheet metal body lie in a single plane.

With the securing arrangement extending right through the aperture of the other sheet member, it may be possible for the series of links to be moved into their locked state by use of a suitable tool, for instance a tool inserted into the spatial area and levered against the surface of the other sheet member which is remote from the body. However, it is preferred to provide the sheet metal member with an integral actuator which extends outwardly from the series and is capable of being gripped and movable in a specific direction so as to move the series of links into its locked condition. Rather conveniently, this actuator is also preferably provided in the same plane as the body and securing arrangement of the sheet metal member. Also conveniently, the connection between the actuator and the series of links is frangible whereby the actuator may be removed subsequent to assembly of the sheet members.

In a particularly preferred construction, the securing arrangement has two holding links which are disposed at opposite ends of the series and each holding link is pivoted or is flexibly deformable at one end to the body. These holding links are pivoted in opposite directions and away from each other as the series of links is moved into the locked state and outwardly directed surfaces of the holding links face in opposite directions towards the surface of the body.

In a preferred arrangement, the movement of the elongate structure into the locked state causes an increase in size of the spatial area as parts of the elongate structure move outwards from the surface of the body from which the structure extends. Hence when the elongate structure comprises a plurality of links for the purpose of moving end holding links into securing positions, then more central links move outwards from the surface to cause that movement. In an alternative arrangement, parts of the elongate structure move towards the surface of the body to cause the structure to assume the locked state. Thus in the case where the elongate structure comprises a plurality of links, then for the purpose of moving end holding links into securing positions, more central links move inwards towards the surface of the body.

It is further to be preferred that there are four links in the series with the two outer links being the holding links and two inner links being pivoted together at adjacent ends with remote ends pivoted one to each of the holding links. The adjacent pivoted ends of the two inner links are movable outwards of the spatial area to cause their remote ends to move away from each other during movement of the series into the locked state so as to effect the pivoting or flexibly deforming of the holding links in the opposite directions as discussed above. In the latter preferred construction, where an actuator is used, conveniently it extends away from the spatial area at the pivotal position of the adjacent ends of the two inner links.

The invention also includes a combination of two sheet members to be joined together wherein: a first of the sheet members is a sheet metal member comprising a sheet metal body and a securing arrangement for securing the sheet members together with the body of the first sheet member engaging a second of the sheet members, the securing arrangement comprising an elongate structure having two ends integral with the sheet metal body with the elongate structure extending from a surface of the body and with the elongate structure and the body together extending around a spatial area, the structure having a specific minimum width; and the second sheet member having an aperture for receiving the elongate structure at its specific minimum width with a first surface of the second sheet member engaging the surface of the body of the first sheet member; the elongate structure after having been received in the aperture, being flexibly and plastically movable into a locked state of width greater than the specific minimum width, movement of the elongate structure into the locked state causing a locking part of the structure to flex outwards into a securing position in which it engages the second sheet member and securely grips the second sheet member between the surface of the body and the locking part of the structure.

Further, according to the invention, there is provided an assembly of two sheet members in which: a first of the sheet members is a sheet metal member having a body and a securing arrangement comprising an elongate structure having two ends integral with the sheet metal body and extending from a surface of the body; and a second sheet member being held in fixed engagement with the surface of the body with the elongate structure extending into an aperture extending through the second sheet member and with the elongate structure flexibly expanded into a locked state in which a locking part of the structure is held flexed outwards in a securing position in which the second sheet member is securely gripped between the surface of the body and the elongate structure.

BRIEF DESCRIPTION OF THE DRAWING

Embodiments of the invention will now be described, by way of example, with reference to the accompanying drawings, in which.

DETAILED DESCRIPTION OF THE INVENTION

Figure 1:
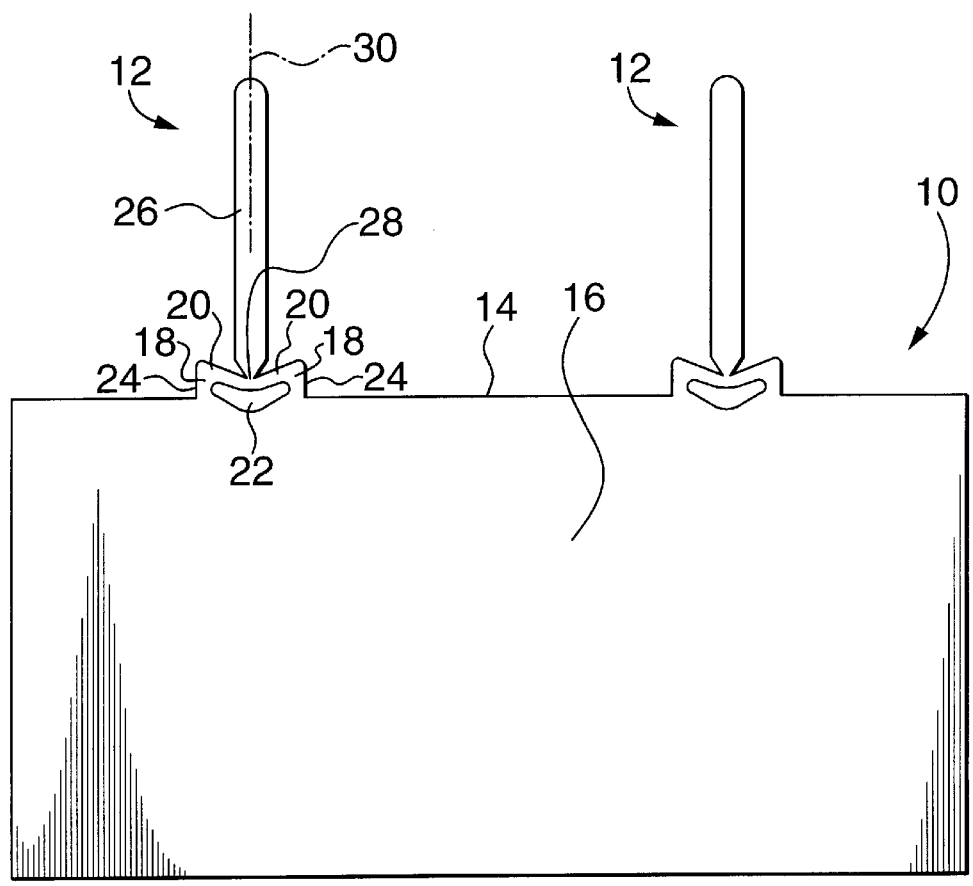
FIG. 1 is a plan view of a sheet member according to a first embodiment and having a securing arrangement for securing it to another sheet member.

As shown in FIG. 1, a sheet member in the form of a sheet metal member 10 to form one side of a box, to be described, comprises a plurality of securing arrangements 12 spaced apart along one edge 14 of the member 10. Each securing arrangement 12 is an elongate structure which comprises a plurality of links which are integral with each other and also are integral with the body 10. The links extend in the plane of the body 16 of the sheet metal member, i.e. outwardly from the surface of the body 16 at the edge 14. The securing arrangement is conveniently formed during stamping or pressing of the sheet metal member.

As may be seen from FIG. 1, each securing arrangement 12 comprises four links, two outer holding links 18 which extend outwardly and integrally from the body 16 and two other links 20 which extend between the links 18 so as to connect the links 18 and define within the structure a spatial area 22. The links 18 have surfaces 24 directed outwardly from the spatial area 22 and these surfaces 24 extend substantially normal to the surface of the edge 14. From their junction with the links 18, the other links 20 extend inwardly towards the body 16 to the junction position of the two links 20. At this junction position an integral actuator extends outwardly from the securing arrangement and away from the body 16. This actuator is an elongate member 26 which has a narrow neck 28 connecting it to the junction position of the two links 20 to render the connection between the actuator and the links 20 frangible. As may be seen from FIG. 1 each of the securing arrangements 12 is symmetrical about a center line 30 extending along the actuator 26 and there is a specific overall minimum width between the surfaces 24 of the links 18.

Figure 2:
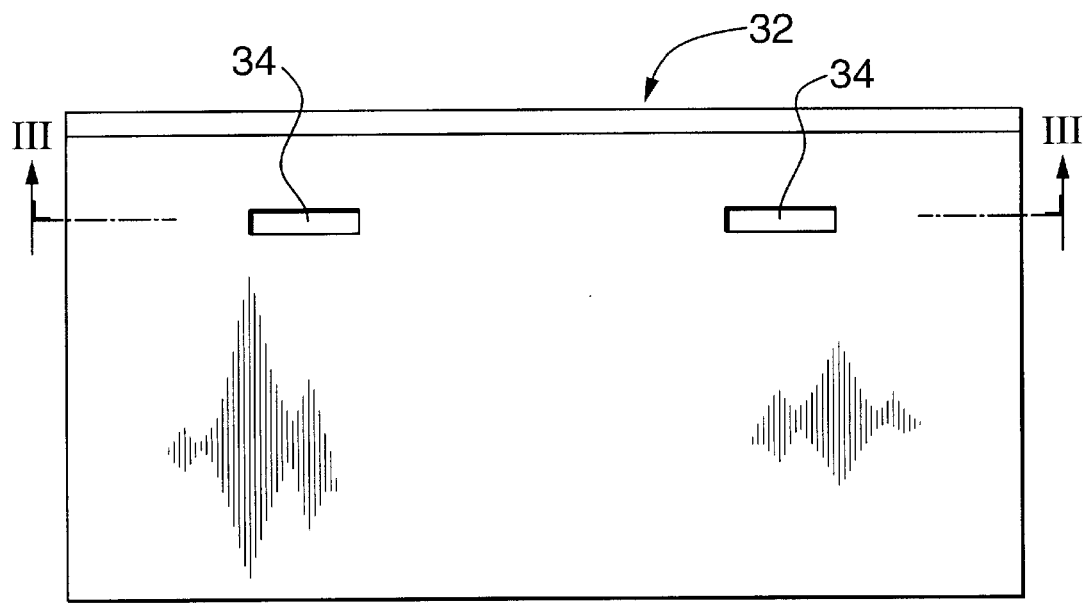
FIG. 2 is a plan view of the other sheet member of the first embodiment.

Another sheet member in the form of a sheet metal member 32 (FIG. 2) has a plurality of elongate rectangular apertures 34 spaced apart in corresponding positions to the locking arrangements 12. These apertures 34 are provided for accommodating the locking arrangements 12 for securing the two sheet metal members together with the locking arrangements being push fits into the apertures in the specific overall minimum width condition.

Figure 3:
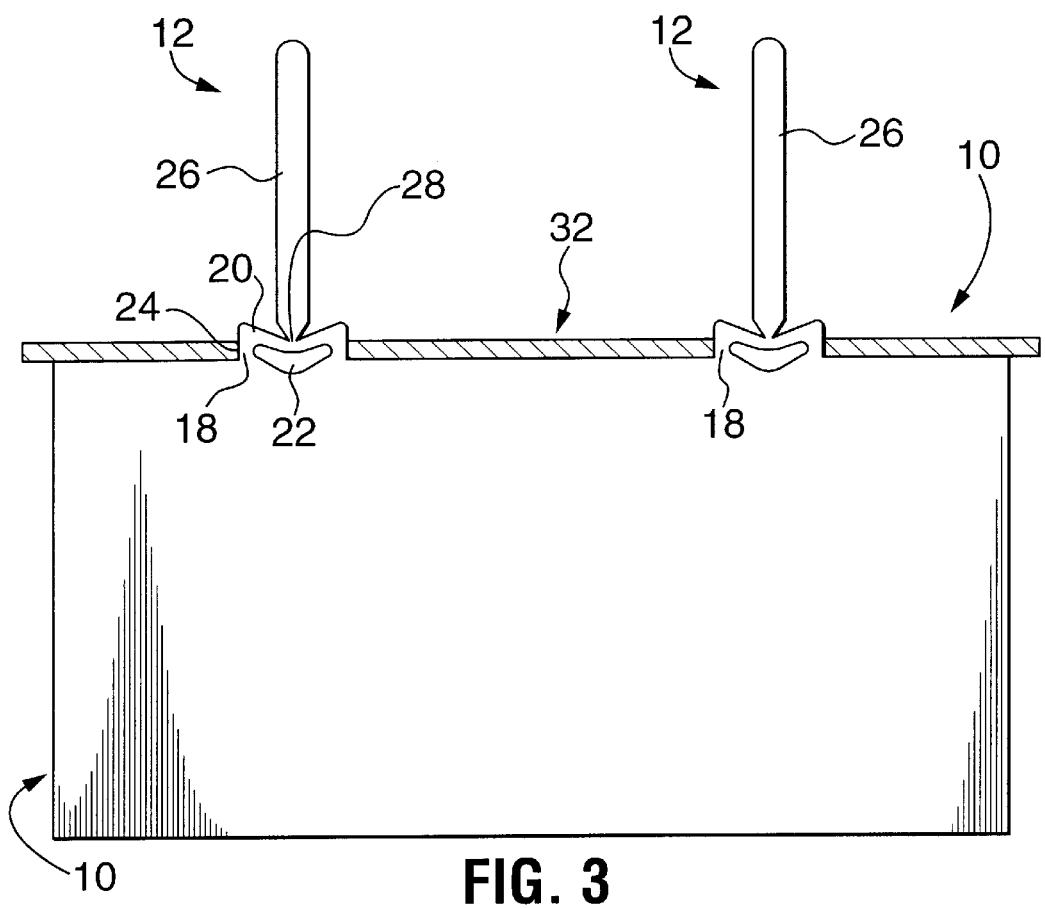
FIG. 3 is a cross-sectional view through the second sheet member taken along line III—III in FIG. 2 and showing the two members during one stage of their assembly together.
Figure 4:
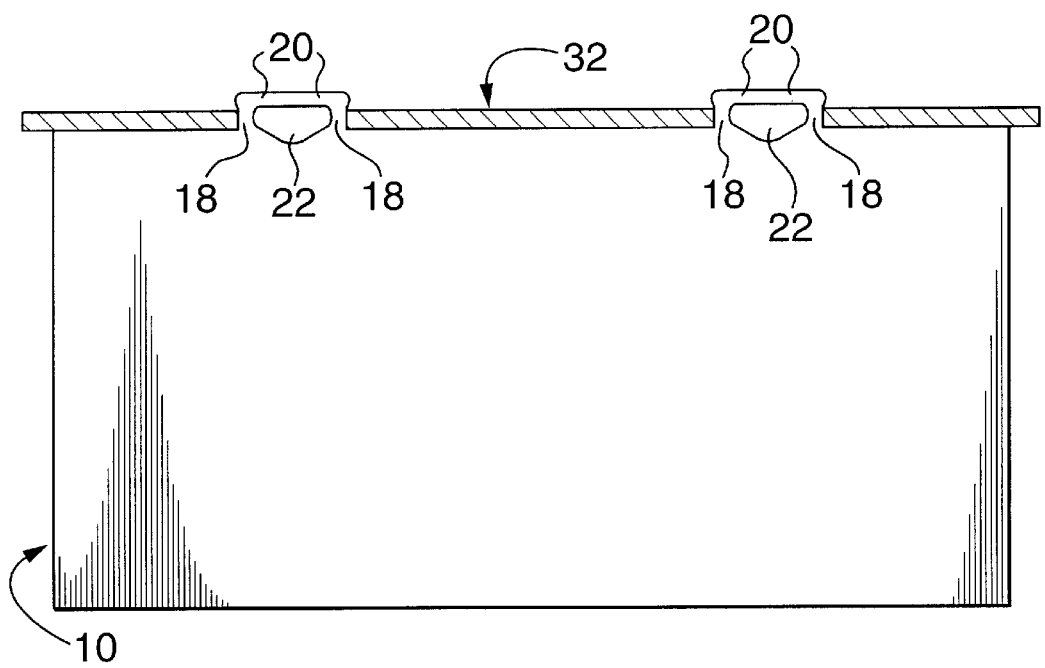
FIG. 4 is a view similar to FIG. 3 of the final stage of assembly of the members.

As shown in cross-section in FIG. 3 the two members 10 and 32 are assembled together to form two sides of a box structure with the securing arrangements 12 passing through the apertures 34. With the two members positioned together, as shown in FIG. 3 and with the surface of the edge 14 firmly up against a major planar surface of the sheet metal member 32, the actuators 26 are pulled outwardly away from the structure. The securing arrangement is flexible with the links 18 and 20 at their junction positions with each other and with the body being flexibly and plastically deformable so as to effect a pivoting action of the links relative to each other and also of the links 18 relative to the body. Hence, as each of the actuators 26 is pulled outwards as shown by FIG. 3 to FIG. 4, the links 20 are urged outwardly from the member 10 at their common junction point thereby enlarging the size of the spatial area 22. This action causes the ends of the links 20 attached to the links 18 to move outwardly from one another thereby causing the links 18 to pivot by distortion of the metal of the links, relative to the edge 14 of the member 10. The links 18 are thus caused to pivot away from each other at their outer ends until, in a locked state of the securing arrangement, the outwardly facing surfaces 24 engage and then pressurize the surfaces 38 of the apertures 34. Thus, the sheet metal member 32 is gripped at the end of each of the apertures 34 between the surface of the edge 14 of the member 10 and a surface 24 of a link 18. The gripping force is substantial and is sufficient to hold the two members 10 and 32 together in assembled condition. This gripping action is caused as may now be seen by expansion of each series of links from a position with the series having its specific minimum width (i.e. a distance between the surfaces 24 in FIG. 1) to a maximum width which extends between the outer extremes of the pivoted outward links 18 as shown in FIG. 4). The gripping action applied by each of the links 18 of each securing arrangement increases until the pull upon its actuator 26 is insufficient to increase the pressure at the end surfaces 38 of the corresponding aperture, at which time the frangible neck 28 of the actuator 26 severs so that the actuator becomes separated from the securing arrangement.

In the finished condition as shown in FIG. 4, each securing arrangement is retained in its locked state because the links 20 have been moved to an overcenter position, i.e. into and beyond a straight line position of these links by pulling upon the actuator 26. The angle between the links 20 is then such as to prevent relative pivoting of these two links such as would be required to move the links 18 towards each other for releasing the member 32. The members 10 and 32 are thus immovably held together.

Figure 5:
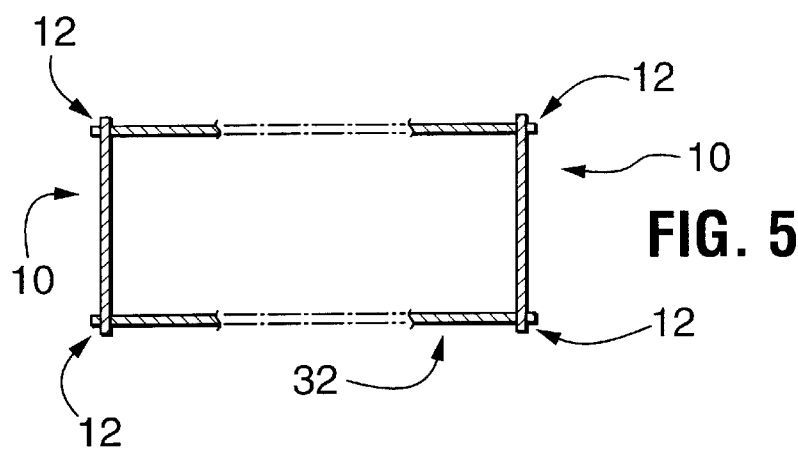
FIG. 5 is a diagrammatic cross-sectional view of a box assembly according to a second embodiment and incorporating sheet members as shown in FIGS. 1 to 4.

The structure of the assembly according to the first embodiment may be used for constructing a box arrangement of a second embodiment such as shown by FIG. 5 having two members 10 and two members 32 positioned in a rectangular configuration. Such a box structure is convenient for use as a shelf for mounting electronic components. It is particularly suitable for this type of usage as the securing arrangement described in the first embodiment is satisfactory to ensure that such a box provides EMI protection to the electronic components to be contained therein. This is because the pressure mounted by the links 18 of each of the securing arrangements upon the members 32 is substantial and provides a gas-tight seal with the opposing surfaces 38 of the apertures 34 of the members 32. Hence, there is a positive electrical connection between the members 32 and the members 10 which is particularly suitable for EMI shielding requirements. In addition, the connection between the members 10 and 32 conveniently provided with the securing arrangements 12 may be affected after electronic components are mounted upon one or other of the sheet metal members without any possible damage resulting to the components or to their resultant operation. Thus, while the securing arrangements 12 ensure that there are provided excellent gas-tight contacts between the sheet metal members for grounding conditions, these requirements are provided without subjecting the structure to the heat of welding which could result in damage to the operability of the electronic components.

In the embodiments described above, each of the securing arrangements is as shown in FIG. 4 as projecting slightly from the opposite side of the sheet metal member 32 after assembly. In order to conceal the securing arrangements within the sheet metal member 32, it is possible to provide the sheet metal member 32 with substantial thickness so that the securing arrangements are contained completely within the apertures 34.

As shown by a third embodiment now to be described, it is possible for the sheet metal members to still be in secure engagement with each of the securing arrangements 12 completely protected.

Figure 6:
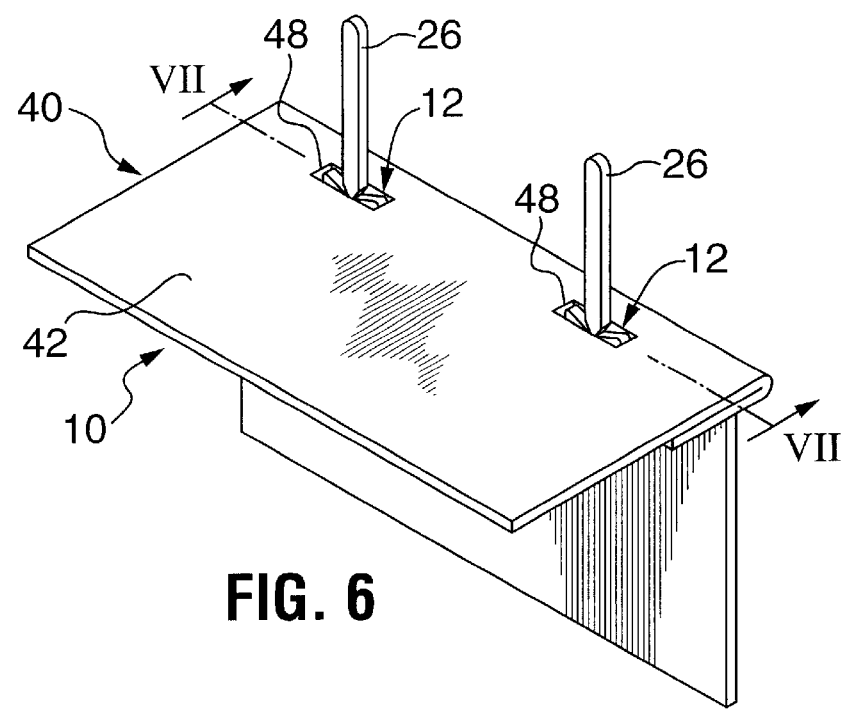
FIG. 6 is an isometric view of part of a box assembly of sheet members according to a third embodiment.

In the third embodiment as shown in FIG. 6, the sheet metal member 10 is as described in the first embodiment with securing arrangements 12 also as previously described. The sheet metal member 10 is to be attached to another sheet metal member 40. The sheet metal member 40 has a body 42 with a turned over edge 44 which lies alongside the body 42. The edge 44 is provided with apertures 46 similar to the apertures 34 of the first embodiment and these apertures are aligned with further apertures 48 (FIG. 7) provided in the main body 42. It is convenient if the apertures 48 are longer than the apertures 46 as shown by FIG. 7 for containing the increased width across each of the securing arrangements 12 after these have been expanded into their locked state.

Figure 7:
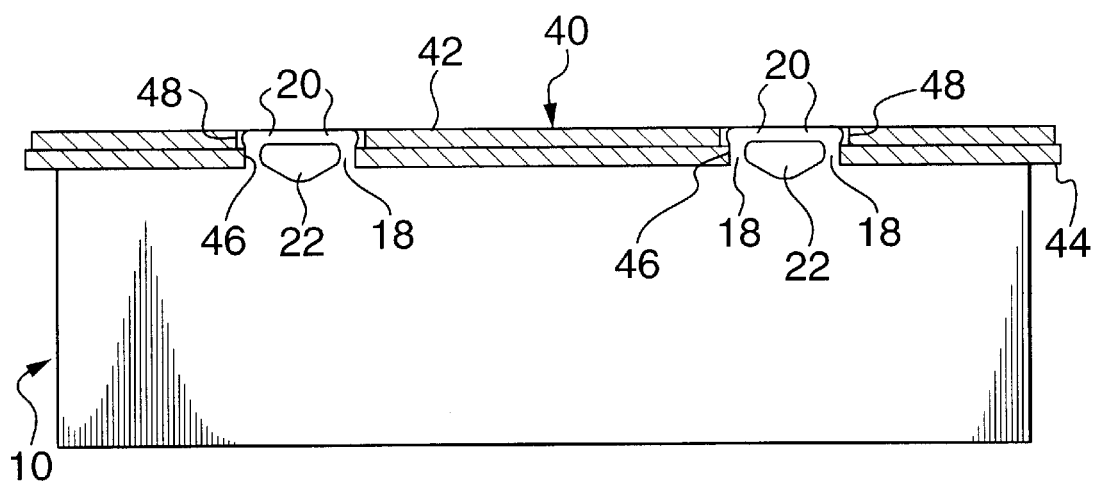
FIG. 7 is a cross-sectional view taken along line VII—VII in FIG. 5 of the attachment of the two sheet members.
Figure 8:
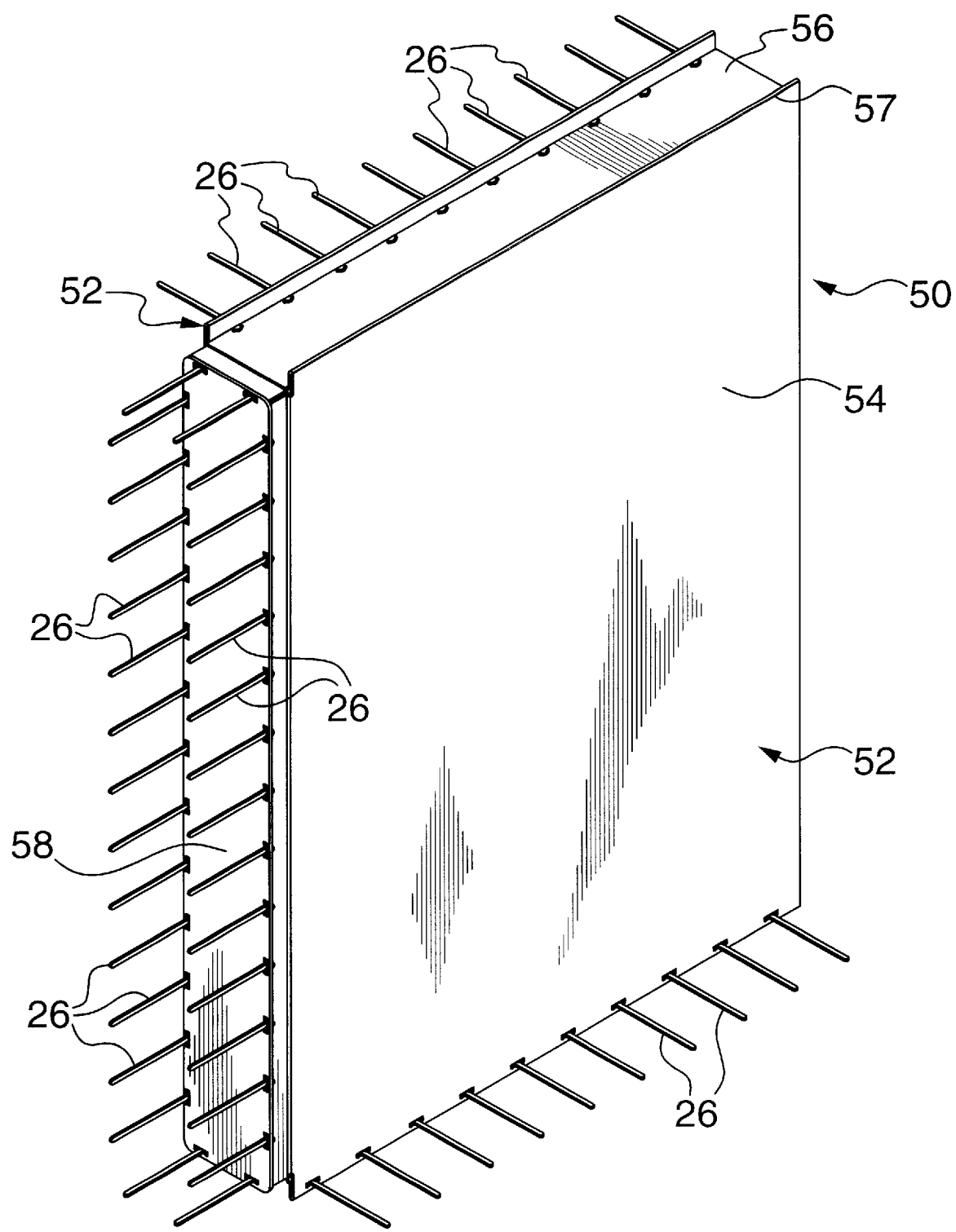
FIG. 8 is an isometric view of a box assembly forming a fourth embodiment of the invention.
Figure 9:
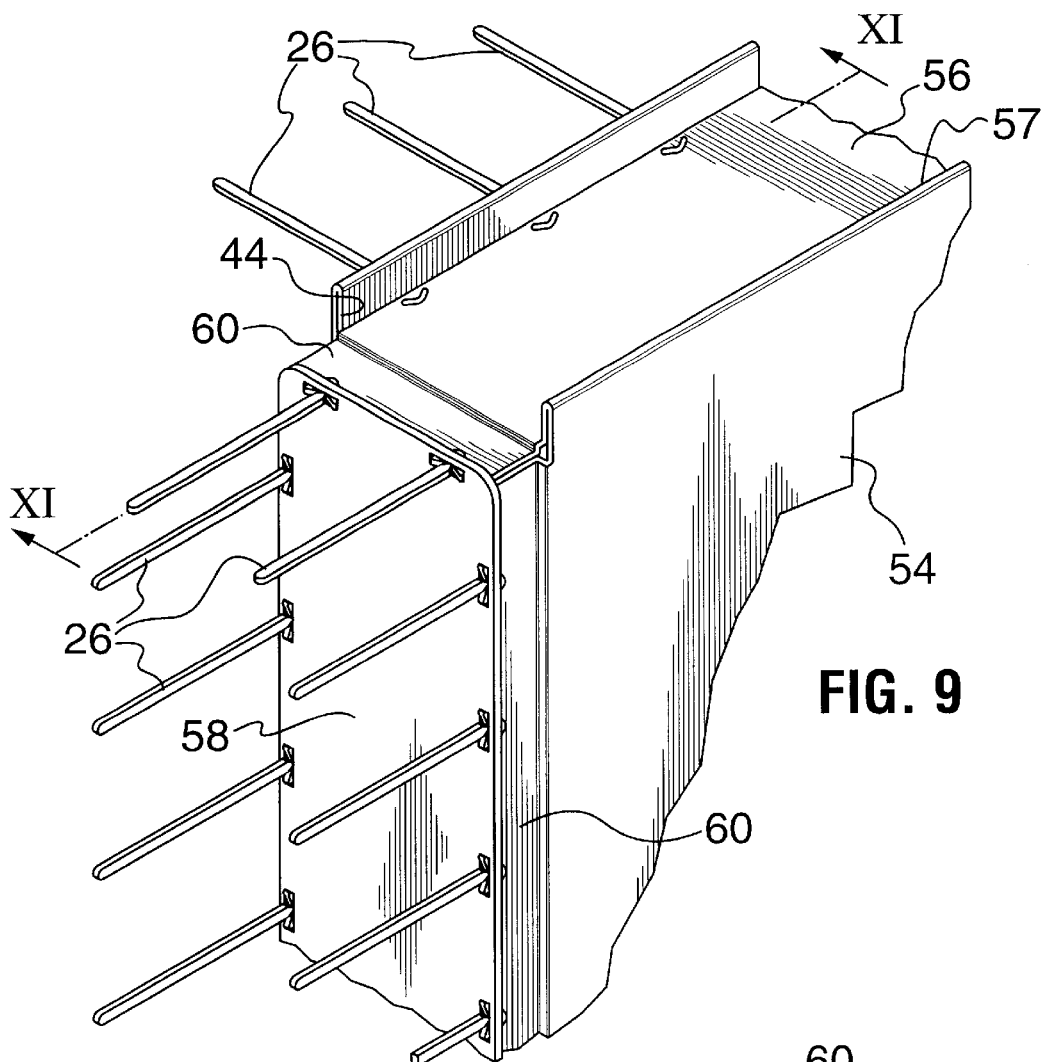
FIG. 9 is a view similar to FIG. 8 of a part of the assembly of the fourth embodiment and to a larger scale.
Figure 11:
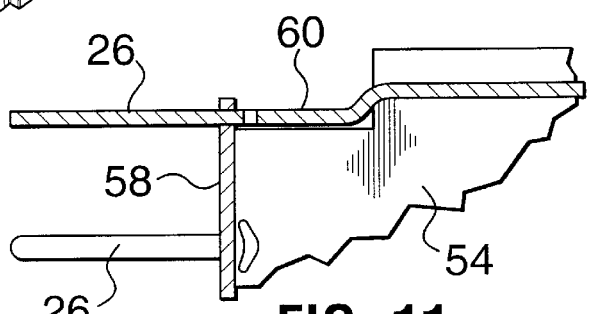
FIG. 11 is a cross-sectional view through the box assembly of the fourth embodiment taken along XI—XI in FIG. 9.
Figure 10:
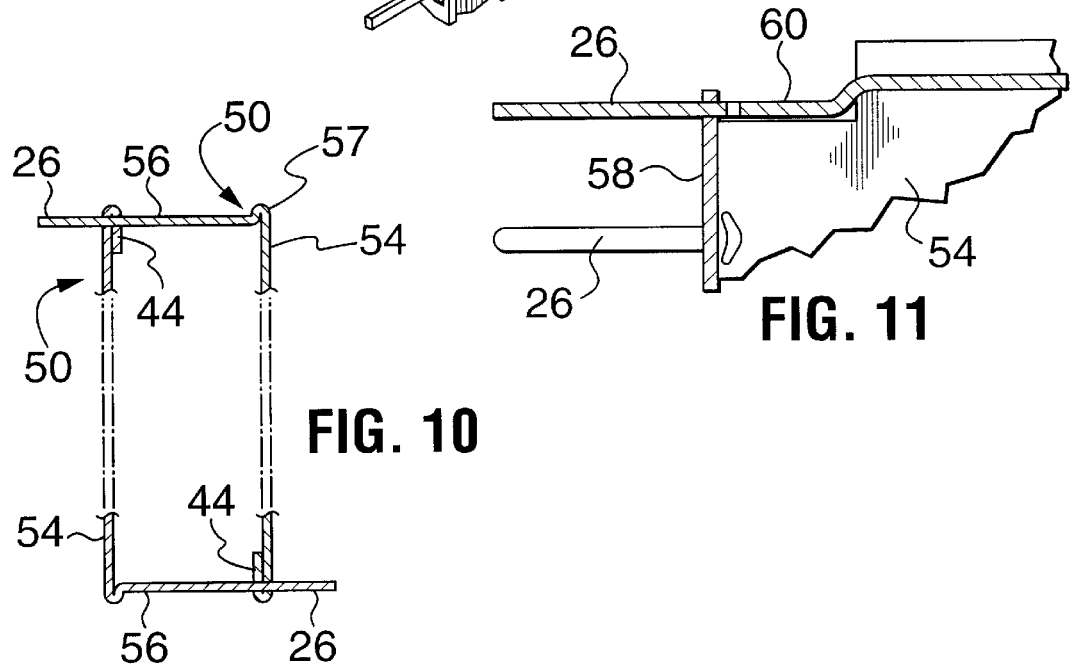
FIG. 10 is a cross-sectional view through the box assembly of the fourth embodiment taken along line X—X in FIG. 8.

As shown by FIG. 7 the sheet metal member 10 is assembled to the sheet metal member 40 with an edge of the member 10 engaging a surface of the turned around portion 44. After the securing arrangements 12 have passed through the apertures 46 in their minimum width condition, the actuators 26 are operated as described in the first embodiment to move the links of each securing arrangement into the locked state. In these conditions, the links 18 are pivoted outwards so as to engage the end surfaces of the apertures 34 as shown by FIG. 7. After the actuators 26 have broken away from the structure, the thickness provided by the body 42 and turned over portion 44 of the body 40 is sufficient to conceal the expanded series of links of each securing arrangement as shown by FIG. 7. Hence, with this construction, the securing arrangements do not extend beyond the members 40.

The structure of the third embodiment, FIGS. 6 and 7, is convenient for use in a box arrangement such as shown in the fourth embodiment in FIGS. 8 to 11 which is provided for holding electronic components other than edge cards. In this box arrangement 50, two like sheet metal members 52 are provided. Each sheet metal member 52 is L-shaped and has one planar side 54 integral with another and narrower planar side 56 extending normal to the planar side 54. The sides 54 and 56 are joined by folded corner structures 57 provided for rigidity purposes. The planar side 56 has at its free edge a plurality of the securing arrangements 12 indicated by their actuators 26 still shown attached. The free edge of each side 54 has a turned over edge 44 as shown and described with reference to FIG. 6. Thus, as may be seen from FIGS. 8, 9 and 10, the two members 52 are assembled together with the sides 54 and 56 forming sides of the box and with the securing arrangements 12 received through the appropriate apertures 46 and 48 of the other member 52 to provide two rows of gas-tight connections between the sides.

The box structure is completed by a planar end member 58 which is secured around its edge regions to lateral extensions 60 of the sides 54 and 56 by securing arrangements 12. In FIGS. 8 to 11, the box arrangement 50 is shown before moving the securing arrangements into locked state and before removal of the actuators 26.

Figure 12:
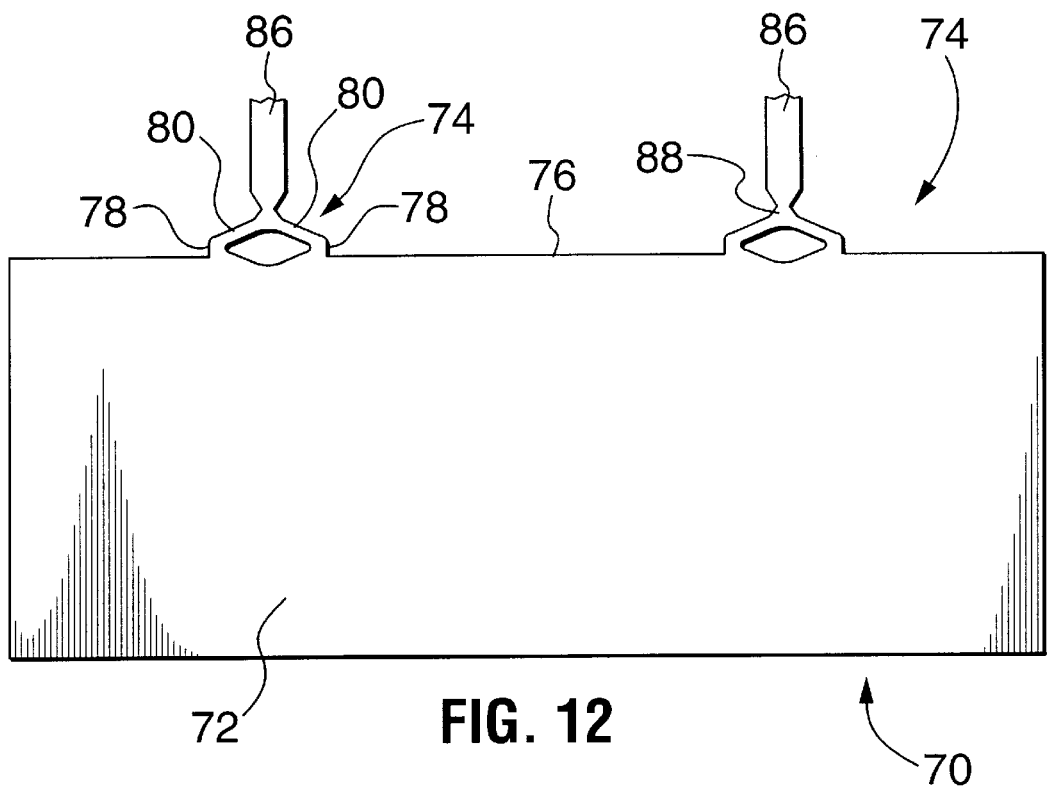
FIGS. 12 and 13 are views similar to FIGS. 1 and 4 of a fifth embodiment.
Figure 13:
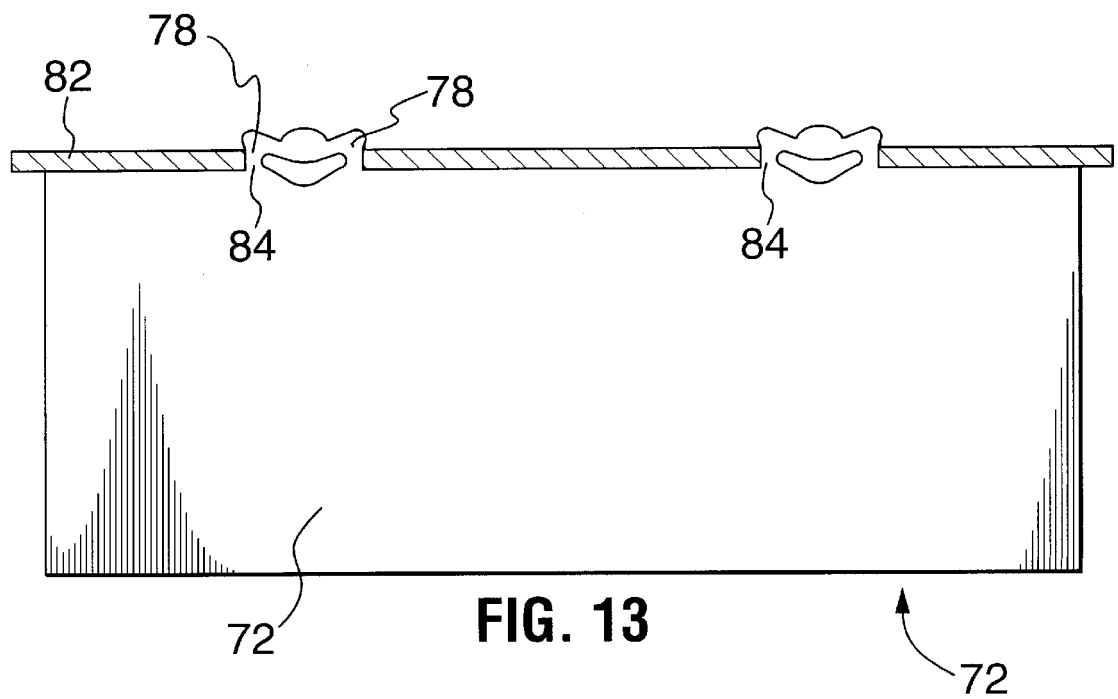

In constructions according to the invention it is not essential for the elongate structure of a securing arrangement to be pulled away from its associated sheet metal member. This is shown in the structure of the fifth embodiment in FIGS. 12 and 13 in which one sheet metal member 70 has a body 72 having securing arrangements 74 extending in spaced positions from an edge 76 of the body. Each arrangement has a plurality of links some of which are movable inwardly towards the edge 76 to move the arrangement from a specific minimum width to a greater width in a locked state of the arrangement. More particularly, as shown in FIG. 12, each securing arrangement 74 has two outer links 78 and two inner links 80 integral with the outer links which, in turn, are integral with the body 72. With each securing arrangement in its minimum width condition, the inner links 80 are positioned outwardly from the body 72 as shown by FIG. 12. When, as shown by FIG. 13, the sheet metal member 70 is assembled to another sheet metal member 82 by passage of the securing arrangements 74 through suitable apertures 84 in the member 82, an actuator 86 is pushed inwards towards the body 72 to force the inner links 80 inwardly thereby decreasing the angle between these links. This action pivots or flexibly deforms the outer links outwards to grip the member 82 between the edge 76 of body 72 and the outer links. In the locked state of each securing arrangement, the inner links have moved overcenter, i.e. beyond their straight line position, so as to hold the outer links in their outer positions. The actuators 86 may then be broken away from the links at a frangible neck 88.

What is claimed is:

1. A sheet metal member having a sheet metal body and a securing arrangement for securing the sheet metal member to another sheet member with a surface of the body of the sheet metal member engaging the other sheet member, and with the securing arrangement extending through an aperture in the other sheet member, the securing arrangement comprising an elongate structure having two ends integral with the sheet metal body with the elongate structure extending from the surface of the body and with the elongate structure and the body together extending around a spatial area, the structure having a specific width and being flexibly and plastically movable into a locked state of greater width in which a locking part of the structure is flexed outwards and towards the surface of the body and into a securing position to securely grip the other sheet member between the surface of the body and locking part of the structure.

2. A sheet metal member according to claim 1 wherein the elongate structure comprises a plurality of links which are integral with one another in series and are flexibly and plastically movable relative to one another about junction positions between the links, and the locking part of the structure comprises a holding link with a surface of the holding link directed outwards from the spatial area, and as the structure is being moved into the locked state the links flexibly and plastically move upon one another to move the holding link pivotally outwards to move its outwardly directed surface into the securing position.

3. A sheet metal member according to claim 2 wherein the elongate structure comprises two holding links, the holding links being disposed at opposite ends of the structure and each holding link being flexibly and plastically movable to pivot it at one end to the body, the holding links being pivoted in opposite directions and away from each other as the series is moved into the locked state and having outwardly directed surfaces facing in opposite directions towards the surface of the body.

4. A sheet metal member according to claim 3 wherein the links and the body all lie in a common plane.

5. A sheet metal member according to claim 3 wherein an actuator is formed integrally with the series, the actuator capable of being gripped and movable in a specific direction to move the series of links into the expanded state.

6. A sheet metal member according to claim 4 wherein an integral connection between the actuator and the series of links is frangible.

7. A sheet metal member according to claim 3 wherein there are four links in the series with two outer links of the series being the holding links and the two inner links being pivoted together at adjacent ends and at remote ends pivoted one to each of the holding links, the adjacent pivoted ends of the two inner links being movable outwards of the spatial area to cause their remote ends to move away from each other during movement of the series into the locked state to effect pivoting of the holding links in opposite directions towards the surface of the body.

8. A sheet metal member according to claim 3 wherein there are four links in the series with two outer links of the series being the holding links and the two inner links being pivoted together at adjacent ends and at remote ends pivoted one to each of the holding links, the adjacent pivoted ends of the two inner links being movable inwards of the spatial area to cause their remote ends to move away from each other during movement of the series into the locked state to effect pivoting of the holding links in opposite directions towards the surface of the body.

9. A sheet metal member according to claim 6 wherein an actuator is formed integrally with the series, the actuator extending away from the spatial area and away from the pivotal position of the adjacent ends of the two inner links and the actuator being capable of being gripped and moved relative to the spatial area to move the series of links into the locked state.

10. A sheet metal member according to claim 9 wherein the body of the sheet metal member, the series the links, and the actuator all lie in a common plane.

11. A combination of two sheet members to be joined together wherein:

a first of the members is a sheet metal member comprising a sheet metal body and a securing arrangement for securing the sheet metal member to another sheet member with the surface of the body of the sheet metal member engaging the other sheet member, the securing arrangement comprising an elongate structure having ends integral with the sheet metal body with the elongate structure extending from a surface of the body and with the elongate structure and the body together extending around a spatial area, the structure having a specific minimum width;

and a second sheet member having an aperture for receiving the elongate structure at its specific minimum width with a first major surface of the second sheet member engaging the surface of the body;

the elongate structure after having been received into the aperture, being flexibly and plastically movable into a locked state of width greater than the specific minimum width, movement of the elongate structure into the locked state causing a locking part of the structure to flex outwards into a securing position in which it engages the second sheet member and securely grips the second sheet member between the surface of the body and the locking part of the structure.

12. A combination according to claim 11 wherein the aperture is tapered and the locking part engages and grips against the tapered surfaces to securely grip the second sheet member between the surface of the body and the locking part.

13. A combination according to claim 11 wherein the elongate structure comprises two holding links, the holding links being disposed at opposite ends of the structure and each being flexibly and plastically movable to pivot it at one end to the body, each holding link having an outwardly directed surface with the outwardly directed surfaces facing in opposite directions to grip the second sheet member at two different locations to the body.

14. A combination according to claim 13 wherein an actuator is formed integrally with the elongate structure, the actuator extending through the aperture and out beyond the second sheet metal member upon assembly of the sheet metal members, the actuator capable of being gripped and movable in a specific direction to move the elongate structure into the locked state.

15. An assembly of two sheet metal members in which:

a first of the sheet member is a sheet metal member having a sheet metal body and a securing arrangement comprising an elongate structure having two ends integral with the sheet metal body and extending from a surface of the body;

and a second sheet member being held in fixed engagement with the surface of the body with the elongate structure extending into an aperture extending through the second sheet metal member and with the elongate structure flexibly expanded into a locked state in which a locking part of the structure is held flexed outwards in a securing position in which the second sheet member is securely gripped between the surface of the body and the elongate structure.

* * * * *